No. 640,756. Patented Jan. 9, 1900.
F. DOUGLAS.
BICYCLE CHAIN GUARD.
(Application filed Mar. 27, 1899.)
(No Model.)
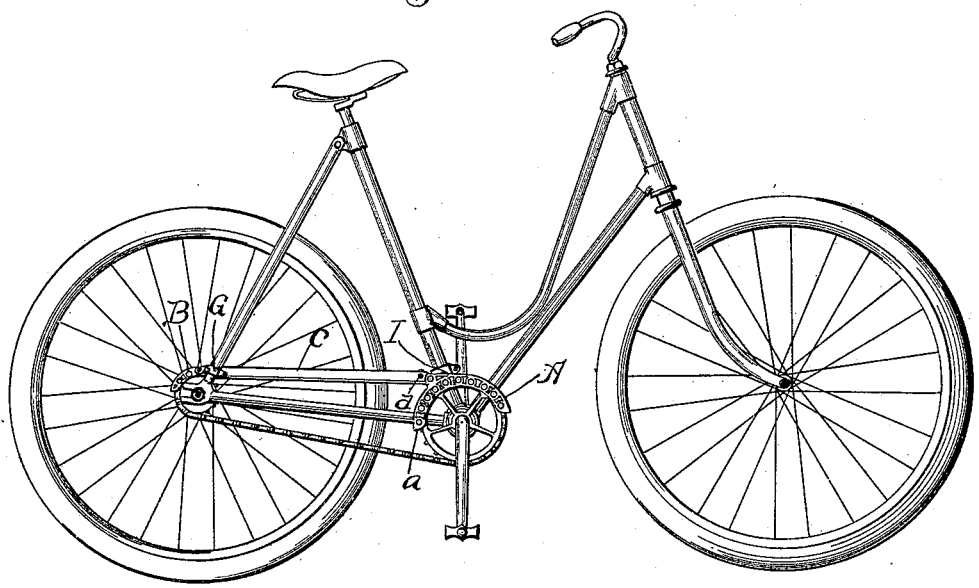
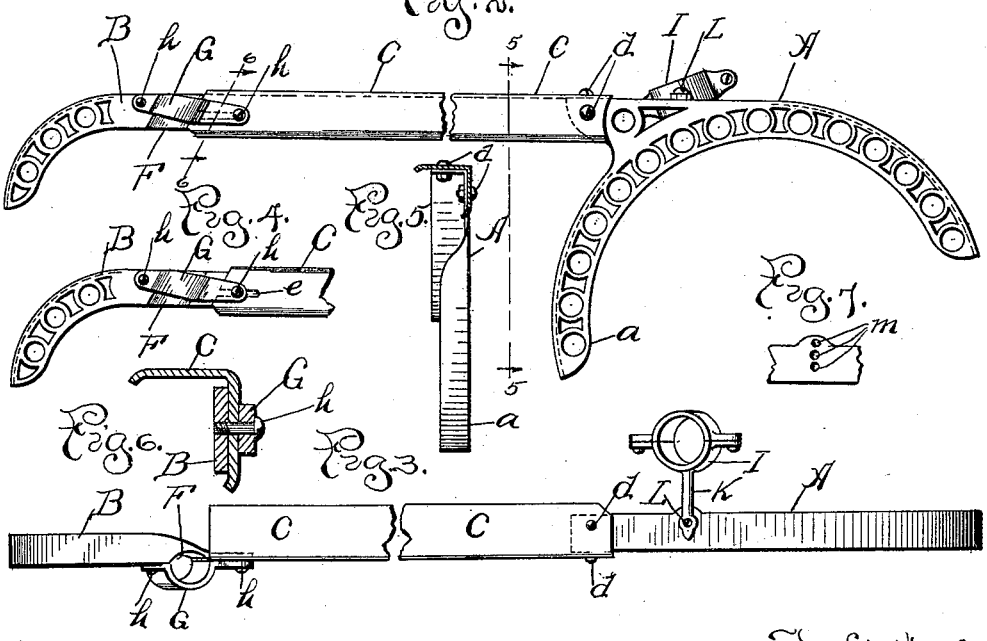
Witnesses:
J B Keir.
C. A. Patterson
Inventor
Frank Douglas

UNITED STATES PATENT OFFICE.

FRANK DOUGLAS, OF CHICAGO, ILLINOIS.

BICYCLE-CHAIN GUARD.

SPECIFICATION forming part of Letters Patent No. 640,756, dated January 9, 1900.

Application filed March 27, 1899. Serial No. 710,554. (No model.)

*To all whom it may concern:*

Be it known that I, FRANK DOUGLAS, a citizen of the United States, residing at Chicago, in the county of Cook, State of Illinois, have invented a new and useful Improvement in Bicycle-Chain Guards, of which the following is a specification.

My invention relates more particularly to an adjustable chain and sprocket wheel protecting guard to prevent the clothing of the rider from contact with the chain or the sprocket-wheels, as the upper half of the sprocket-wheels and the upper forward run of the chain are all that the clothing could reach or come in contact with.

I make my guard to cover the top and outer face of the upper forward run of the chain and about one-half of the upper circumference of the sprocket-wheels, leaving the lower and loose backward run of the chain and the lower part of the sprocket-wheel which the clothing of the rider could not reach or come in contact with uncovered and with nothing for the chain to strike against while riding.

The objects of my invention are, first, to furnish a neat and sufficient guard for the protection of the clothing from all of the chain and sprocket wheels that the clothing of the rider could reach or come in contact with while riding, and, secondly, to provide an adjustable guard that may be quickly attached to any bicycle and easily adjusted to any size of sprocket-wheels or to varied lengths of chain.

I dispense entirely with the continuation of the chain-guard under the chain, as that would prevent the necessary up-and-down adjustment of the guard. I also dispense entirely with the objectionable lacing cords or braces from the guard over the chain to the part that extends around the front sprocket-wheel under the chain.

The top and side protection of my guard, with its curved extensions over the upper curved portion of the sprocket-wheels, is all the guard protection required to prevent the clothing of the rider from contact with the chain, as the clothing never drops to or below the lower chain.

My guard is easily attached firmly to the frame by its own clamp-fastenings without drilling holes in or defacing the frame.

My guard has but a single reach over the top chain and a good protection over the sprocket-wheels and may be used successfully and present a neat appearance on gentlemen's wheels for a trousers-guard.

My invention is fully illustrated by the accompanying drawings, in which—

Figure 1 shows a side elevation of the whole guard attached to a lady's bicycle by the clamp I around the seat-post tube in front and the clamp G around the upper stay of the frame to hold the rear part of the guard. Fig. 2 is a side elevation of the entire guard, showing the clamps for attaching it to the bicycle-frame, the portion of the guard A covering the upper and the back portion of the front sprocket-wheel, the reach C, shown broken, attached to part A by screws or rivets d d, the guard over the rear sprocket B, and the adjustable clamp G for clamping the rear end of the guard to the frame and for clamping the reach C adjustably to part B. Fig. 3 is a plan view of the entire guard as shown in Fig. 2 and shows the clamps I and G more clearly. Fig. 4 is a side elevation of that part of the guard over the rear sprocket, showing the clamp-plate which serves the double purpose of a screw-fastening to the rear stay-tube of the bicycle-frame and a clamp which secures the connecting-reach C of the guard in an adjustable manner to the guard over the rear sprocket-wheel. Fig. 5 is a cross-section of the connecting-reach cut through at line 5 5 and shows the connection of the reach to the guard over the front sprocket-wheel. Fig. 6 is an enlarged cross-sectional view of the connecting-reach C and the guard over the rear sprocket cut through at line 6 6 and shows the screw connection of the reach C to the guard over the rear sprocket. Fig. 7 is a top view of a section of the guard over the front sprocket, showing screw-holes to attach the arm of the clamp connection which attaches the guard to the bicycle-frame.

Similar letters refer to similar parts throughout the several views.

The portion of the guard A may be made of casting from any suitable material or from sheet metal and is intended to cover all of the teeth on the upper part of the front sprocket. The back or inner curved portion A is preferably made to drop lower than the front portion in order to make a safe protection from the upward run of the sprocket-wheel on that side, and it is preferably made in angle form to cover the face as well as the side of the sprocket-teeth. The connecting-reach C is angle-shaped to cover the chain properly and is attached to the guard A by two or more screws or rivets d d. The back end of connecting-reach C is cut on an angle and is preferably slotted at e at the end for the clamp-bolt that attaches it to the guard B over the rear sprocket, and the cap G and bolts h h attach the guard to the frame. The slot E admits of a variation in the length of the guard for adjustment up or down on the frame to fit various sizes of sprocket-wheels. This connecting-reach C may be made a part of the guard A in one casting or stamping or the adjustment may be at screws d d; but for the convenience of the trade and for various sizes of wheels I prefer to make it in three parts and adjustable where the reach C is attached to the guard over the rear sprocket-wheel.

The guard B over the rear sprocket-wheel is angle-shaped and curves far enough down on the sprocket to serve as a perfect protection, and the part in line with the rear upper stay is curved out on an angle to fit the stay at F.

The cap or clamp G is curved about one-half circle of the frame-tube and serves to secure the guard to the frame and the reach C to the guard over the rear sprocket by screws h h.

The clamp I, which attaches the guard to the seat-post tube of the frame, has a projecting arm K, with a flattened end on the proper angle to fit the guard, and has a bolt-hole through which bolt L passes into the bolt-hole m m m to secure the clamp to the guard. A slot might be made to take the place of two or more holes, as a slight-size adjustment may be required to compensate for varied widths of tread.

To attach my chain-guard to a bicycle, the operator has only to attach the guard of the rear sprocket to the rear stay by clamp G, leaving space enough to receive the reach C at bolt h in the slot e, then attach the clamp I to the seat-post tube of the bicycle-frame and adjust it on the tubes high enough to clear the running-chain, then tighten clamp-screws firmly, and it is ready for use.

Nearly all guards in use extend above and below the chain, which prevents the up-and-down adjustment that is required for clearance of the chain.

What I claim, and desire to secure by Letters Patent, is—

1. A chain and sprocket-wheel guard for only the upper line of chain and the upper half of the sprocket-wheels of a bicycle, comprising a curved guard over the teeth of the upper part of a sprocket-wheel with its inwardly-projecting flange over the face of the sprocket-teeth on the backward and downward curved part A, and a reach C extending from the top of the curved part back over the upper line of chain to the clamp B, the clamp B to support and hold the rear end of the guard, and the clamp I to support and hold the front end of the guard, all of which may be adjusted up or down by means of clamp I and clamp B, which clamps around the upright tubing of a bicycle-frame and admits of a change to a larger or smaller sprocket-wheel, substantially as herein specified.

2. A combined clamp and rear-sprocket guard, comprising the inner half of the clamp with its half-circle depression on the angle of a rear frame-stay and having a backward-extending curved guard over the rear sprocket and a forward projection to receive the back end of reach C, and with a cap G, curved to fit outside of the angle rear stay which bolted together forms a clamp to hold the rear end of reach C, and clamp the guard to the rear stay of a bicycle-frame when used in combination with reach C of the chain-guard, substantially as herein specified.

FRANK DOUGLAS.

Witnesses:
JOHN B. WEIR,
CHARLES A. PATTERSON.